United States Patent [19]

Haberfellner et al.

[11] Patent Number: 4,492,742
[45] Date of Patent: Jan. 8, 1985

[54] ELECTROCHEMICAL STORAGE CELL

[75] Inventors: Fritz Haberfellner, Heidelberg; Stefan Mennicke, Leimen-Gauangelloch; Gerd Prappacher, Schwetzingen, all of Fed. Rep. of Germany

[73] Assignee: Brown, Boveri & Cie AG, Mannheim, Fed. Rep. of Germany

[21] Appl. No.: 595,644

[22] Filed: Apr. 2, 1984

Related U.S. Application Data

[63] Continuation of Ser. No. 431,371, Sep. 30, 1982, abandoned.

[30] Foreign Application Priority Data

Nov. 13, 1981 [DE] Fed. Rep. of Germany ....... 3145112

[51] Int. Cl.³ ............................................ H01M 10/39
[52] U.S. Cl. .................................................... 429/104
[58] Field of Search ......................................... 429/104

[56] References Cited

U.S. PATENT DOCUMENTS

| | | | |
|---|---|---|---|
| 3,841,912 | 10/1974 | Kagawa et al. | 429/104 |
| 3,883,367 | 5/1975 | Chiku et al. | 429/104 |
| 3,932,195 | 1/1976 | Evans et al. | 429/104 |
| 4,011,367 | 3/1977 | Evans et al. | 429/104 |
| 4,027,075 | 5/1977 | Nakabayashi et al. | 429/104 |
| 4,129,690 | 12/1978 | Jones et al. | 429/104 |
| 4,167,807 | 9/1979 | Verity | 429/104 |

Primary Examiner—Donald L. Walton
Attorney, Agent, or Firm—Herbert L. Lerner; Laurence A. Greenberg

[57] ABSTRACT

Electrochemical storage cell of the sodium and sulfur type with at least one anode space for receiving the anolyte and a cathode space for receiving the catholyte, which are separated from each other by an alkali ion-conducting solid electrolyte and are bounded at least in some areas by a metallic housing. The cathode space is in communication via at least one connecting element with at least one supply container for the sodium polysulfide being formed in the chemical reaction.

8 Claims, 2 Drawing Figures

ELECTROCHEMICAL STORAGE CELL

This application is a continuation of application Ser. No. 431,321, filed Sept. 30, 1982, now abandoned.

BACKGROUND OF THE INVENTION

1. Field of the Invention

The invention relates to an electrochemical storage cell of the sodium and sulfur type with at least one anode space for receiving the anolyte and a cathode space for receiving the catholyte which are separated from each other by an alkali ion-conducting solid electrolyte and are bounded at least in some regions by a metallic housing.

2. Description of the Prior Art

Such rechargeable electrochemical storage cells with solid electrolyte are highly suitable for the construction of storage batteries of high energy and power density. The solid electrolytes used in alkali/sulfur storage cells, which are made, for example, of beta-aluminum oxide, are distinguished by the feature that the partial conductivity of the mobile ion is very high and the partial conductivity of the electrons is smaller by many powers of ten. By using such solid electrolytes for the construction of electrochemical storage cells, practically no self-discharge takes place since the electron conductivity is negligible. Also, the reaction substances cannot pass as neutral particles through the solid electrolyte.

A special example for such rechargeable electrochemical storage cells are sodium/sulfur storage cells which have a solid electrolyte of beta-aluminum oxide. For these storage cells there are two embodiments: the so-called "normal storage cell" and the "inverted storage cell". The difference between the two storage cells is brought about by the different arrangement of the two reactant spaces. In the first-mentioned sodium/sulfur storage cell, the anode space is located inside the solid electrolyte, while the cathode space is arranged between the solid electrolyte and the metallic housing of the storage cell. In contrast thereto, the cathode space in the inverted storage cell is within the solid electrolyte, while the anode space is arranged between the metallic housing and the solid electrolyte. A very great advantage of these inverted sodium/sulfur storage cells is that they have substantially better corrosion resistance than the abovementioned normal sodium/sulfur storage cells. This advantage is offset by the disadvantage that these inverted storage cells of conventional design have less capacity than normal storage cells for the same mechanical design and size of the solid electrolyte. This, in constructing a battery from inverted storage cells to obtain a desired energy content, the number of storage cells must be larger than the number of normal storage cells to obtain the same energy content.

SUMMARY OF THE INVENTION

An object of the invention to provide a sodium/sulfur storage cell and, in particular, an inverted storage cell, with increased energy density and increased capacity which will at least correspond with respect to all requirements which it is to meet during operation, to a normal storage cell with a solid electrolyte of the same size.

With the foregoing and other objects in view, there is provided in accordance with the invention an electrochemical storage cell based on sodium and sulfur comprising at least one anode space for the sodium anolyte and a cathode space for the sulfur catholyte with the anode and the cathode spaces separated from each other by a sodium ion-conducting solid electrolyte which permit sodium ions during the charge of the cell to migrate from the anode space to the cathode space and chemically react to form sodium polysulfide and the reverse reaction during the charge of the cell, said cathode space filled with sulfur catholyte to an extent that the addition of sodium ions during the discharge of the cell causes a rising pressure in the cathode space and the loss of sodium ions during the charge of the cell causes a decreasing pressure in the cathode space, at least one of said spaces bounded at least in some areas by a metallic housing, at least one supply container for the sodium polysulfide formed in the chemical reaction in which the only communication with the cathode space is via at least one porous mat of ceramic showing wick action for transfer of said sodium polysulfide into the supply container by rising pressure caused by the sodium ions coming in the cathode space during the discharge of the cell and for transfer of the sodium polysulfide back into the cathode space by decreasing pressure during the charge of the cell.

Other features which are considered as characteristic for the invention are set forth in the appended claims.

Although the invention is illustrated and described herein as embodied in electrochemical storage cell, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages there will be best understood from the following description when read in connection with the accompanying drawings, FIG. 1. Diagrammatically illustrates an inverted storage cell in accordance with the invention in which a supply container for sodium polysulfide is disposed above the cathode space and separated therefrom by a cover plate. A porous mat made of ceramic fibers and a molybdenum metal support screen extend up from the cathode space into the supply container. The mat is the passage means for transferring the sodium polysulfide from the cathode space into the supply container.

DETAILED DESCRIPTION OF THE INVENTION

Figure 1:
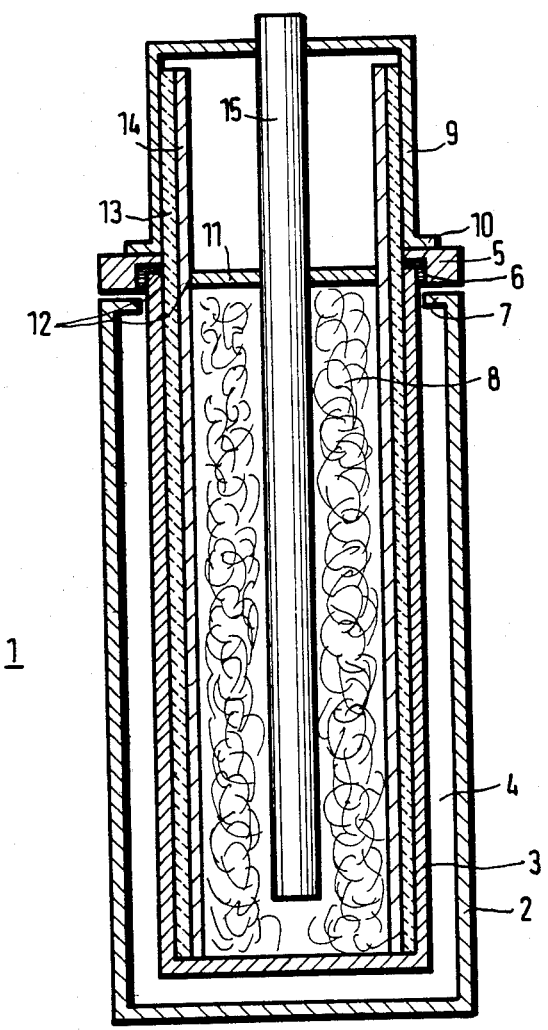

In a storage cell of the type mentioned at the outset, the cathode space is in communication via a connecting element with at least one supply container for the sodium polysulfide which is formed in the chemical reaction.

According to the invention, the cathode space is connected to the supply container via a mat serving as the connecting element. The mat consists of a porous material which is arranged in some regions in the cathode space as well as in the supply container. Inside the cathode space, the mat extends over the entire length of the solid electrolyte and firmly bears against the latter. Inside the supply container, the mat is brought all the way to its closed end and likewise rests firmly against the inner boundary surfaces of the supply container. The mat is preferably made of ceramic fibers. According to the invention, it is pressed by a support element against the solid electrolyte and the inside boundary surfaces of the supply container. The support element is made of a metal screen. The metal screen is as long as the mat. It is preferably made of molybdenum. The remaining portion of the cathode space is filled with sulfur and a graphite felt. A cover plate separates the cathode space from the supply container. Between the cover plate and the solid electrolyte an empty annular space is provided for the mat and for the support element to pass through. The dimensions of the mat are chosen so that the lateral boundary surfaces of the solid electrolyte and the supply container are completely covered by it.

Through the connection of the cathode space to the supply container via the connecting element, which consists preferably of a mat which is made of ceramic fibers, sodium polysulfide can get from the cathode space to the supply container. An inverted storage cell which is equipped with such a supply container exhibits a noticeably better capacity and energy density than the conventionally constructed inverted storage cells. If the inverted storage cell according to the invention, with the cathode space filled with sulfur up to immediately under the cover plate, is discharged, then sodium ions migrate from the anode space through the solid electrolyte into the cathode space. This increases the volume of the reaction substances contained in the cathode space and during the then occurring chemical reactions, sodium polysulfide is formed. Due to the wick action of the mat, the sodium polysulfide is transported along the solid electrolyte in the direction toward the supply container. By the pressure which continues to build up in the cathode space, the sodium polysulfide rising in the ceramic mat is pushed into the supply container. As already mentioned, the cathode space is filled with sulfur and a graphite felt in the sodium/sulfur storage cell. The graphite felt is preferably impregnated with the sulfur. So much sulfur is filled into the cathode space that the graphite felt and the solid electrolyte are always wetted with sulfur under all operating conditions of the storage cell. The sulfur is retained in the cathode space by the cover plate which separates the cathode space from the supply container. As mentioned above, the sodium polysulfide is formed during the discharge of the storage cell and transported via the mat into the supply container. During the charging of the storage cell, the contents of the supply container containing polysulfide is suctioned back from the supply container into the cathode space. The sodium polysulfide is separated into sulfur and sodium by oxidation. By this measure, the graphite felt arranged in the cathode space can be impregnated with sulfur to such an extent that the cathode space is filled completely. With the increase of the reaction substances accumulating in the cathode space, the sodium polysulfide can be transported into the supply space provided for this purpose, so that there is always a sufficient supply of space in the cathode space for the reaction substances which are continuously formed anew during the discharge. In the manufacture of the storage cell, no additional empty space therefore need be provided for these reaction substances.

The invention will be explained in the following in greater detail with particular reference to the drawings.

An inverted sodium/sulfur storage cell 1 is shown in FIG. 1. The storage cell is substantially formed by a metallic housing 2 and a solid electrolyte 3. The solid electrolyte 3 is cup-shaped and arranged inside the metallic housing 2. In the embodiment shown here, the solid electrolyte 3 is made of $\beta$-aluminum oxide. The dimensions of the solid electrolyte 3 are chosen to form between its outside surfaces and the inside surfaces of the metallic housing 2, a coherent space 4 which serves as the anode space. The solid electrolyte is connected at its open end to a ring-shaped insulator 5. The insulator 5 is made of $\alpha$-aluminum oxide and joined to the solid electrolyte 3 via a glass solder 6. The insulator 5 is designed so that it extends outward beyond the solid electrolyte and assumes the function of a flange. The metallic housing 2 of the storage cell 1 has at its open end an inward-directed flange 7. The insulator 5 is placed and supported thereon. Preferably, a seal (not shown here) is also arranged between the insulator 5 and the flange 7. The interior of the solid electrolyte 3 serves as the cathode space 8 in this embodiment.

A cup-shaped container 9 is arranged above the open end of the solid electrolyte 3. The inside diameter of the cup-shaped container 9 is matched to the inside diameter of the solid electrolyte 3. The cup-shaped container 9 faces with its open end the solid electrolyte 3. It is made of metal and has an outward-pointing flange 10, with which it is supported on the insulator 5. The insulator 5 and the flange 10 are firmly connected to each other. The cup-shaped container 9 forms the supply container for the sodium polysulfide. In the vicinity of the insulator 5, the solid electrolyte is provided with a cover plate 11 which separates it from the supply container 9. Between the inner boundary surface of the solid electrolyte 3 and the cover plate 11, an annular empty space 12 is provided for the passage of a connecting element 13 designed as a mat, and a support element 14. The mat 13 is made of a porous material. Ceramic fibers are used for fabricating the mat 13. The mat 13 is bent into a cylinder and is arranged inside the solid electrolyte 3 as well as in the supply container 9. The ceramic mat 13 covers the entire inner boundary surface of the solid electrolyte 3 and rests firmly against the latter. It is brought through the empty annular space 12 and also extends into the supply container 9, as already mentioned above. There, it also bears against the inner boundary surface of the supply container 9. The mat 13 extends from the lower closed end of the solid electrolyte almost to the closed end of the supply container 9. By means of the support element 14, the mat 13 is pressed against the inside surfaces of the solid electrolyte and the supply container 9. The support element 14 is formed by a metallic screen of molybdenum which is bent into a cylinder and is arranged with a defined pretension inside the solid electrolyte 3 and the supply container 9. The length of the metal screen 14 is fitted to the length of the ceramic mat 13. The empty annular space 12 existing between the solid electrolyte 3 and its cover plate 11 is designed so that the support element 14 can be brought, next to the mat 13, from the interior of the solid electrolyte 3 into the supply container 9.

The anodic current collector is formed in this storage cell by the metallic housing 2. The cathodic collector 15 consists in this embodiment example of a metal rod which extends far into the solid electrolyte 3. It goes through the cover plate 11. It is firmly connected thereto. In addition, it is brought through the supply container 9 and extends several millimeters outward beyond the same. The metal 15 is also connected to the closed end of the supply container 9. By fastening the cover plate 11 to the metal rod, it is given a firm hold within the storage cell. Through the additional connection of the metal rod 15 to the supply container 9, the latter is firmly connected to the storage cell 1. As mentioned above, the interior of the solid electrolyte 3 serves as the cathode space 8. The annular space between the metal screen 14 and the cathodic current collector 15 is filled in this embodiment with a graphite felt from the lower end of the solid electrolyte to the cover plate 11. This felt is completely impregnated with sulfur, so that the cathode space contains the amount of sulfur necessary for the operation of the storage cell and the solid electrolyte 3 is always wetted thereby.

The anode space 4 is completely filled with sodium in this embodiment example. If the storage cell is now discharged, sodium ions travel from the anode space 4 through the solid electrolyte 3. Sodium polysulfide is then formed within the ceramic mat 13 and in the area adjacent thereto. Due to the wick action of the mat 13, it travels along the solid electrolyte into the supply container 9. Since with increasing discharge of the storage cell, more and more sodium gets into the cathode space 8, the pressure therein rises due to the increasinfg volume of the reaction substances. As a result of this pressure, the sodium polysulfide is pushed farther and farther into the supply container 9. The sulfur which does not react with the sodium ions remains within the graphite felt and wets the latter and the solid electrolyte 3. The sodium polysulfide produced is transported through the ceramic mat 13 into the supply container 9, enabling the cathode space 8 to take up all sodium ions traveling through the solid electrolyte. No additional empty space need be provided, however, for taking up the reaction substances produced during the discharge. Rather, the cathode space 8 can be filled completely with sulfur and graphite felt.

Figure 2:
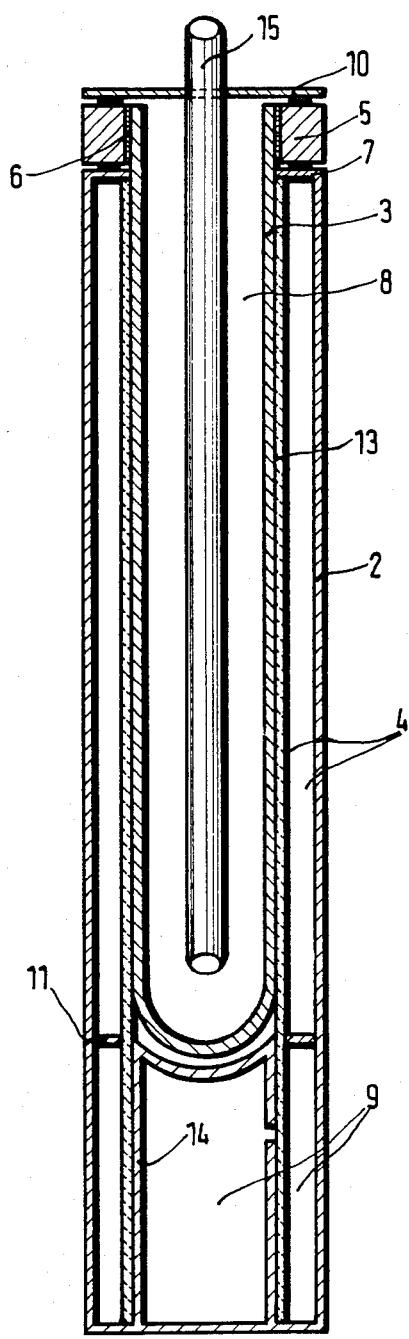
FIG. 2. Illustrates a normal storage cell with a supply container in accordance with the invention disposed at the bottom of the cell and separated from the cathode space. Here again a porous mat of ceramic fibers extends from the cathode space into the supply container and is the means of transferring the chemically formed sodium polysulfide.

In FIG. 2, a normal sodium/sulfur storage cell is shown which likewise includes a storage container for the sodium polysulfide. The sodium/sulfur storage cell has a metallic housing 2 which is cup-shaped and has at its upper open end an inward-pointing flange 7. Inside the housing is arranged the likewise cup-shaped solid electrolyte 3 made of β-aluminum oxide. At its upper open end it has an outward-pointing flange 5 which is formed by an insulating ring of α-aluminum oxide. This insulating ring is connected to the solid electrolyte 3 via a glass solder 6. The dimensions of the solid electrolyte 3 are chosen such that between its lateral inside boundary surfaces and the inside boundary surfaces of the metallic housing 2, a coherent space remains which serves as the cathode space 4. The interior of the solid electrolyte is utilized in this embodiment as the anode space 8. The latter is filled with liquid sodium. A current collector 15 in the form of a metal rod extends into the anode space 8. The anode space 8 has a closure plate 10 made of insulating material which rests on the flange 5 of the solid electrolyte 3. The anodic collector 15 is brought through the closure plate 10 and extends several millimeters outward beyond the plate.

The height of the solid electrolyte 3 is desirably chosen so that it corresponds to about ¾ of the total height of the metallic housing 2. Thereby ¼ of the metallic housing 2, and specifically its lower portion, can serve as the supply container 9 for the sodium polysulfide formed in the cathode space 4 during the discharge of the storage cell. An inward-pointing rim 11 located a small distance from the lower end of the solid electrolyte 3 separates the supply container 9 from the cathode space 4. A mat 13 of porous material is arranged at the outside surfaces of the solid electrolyte 3, and extends between the rim 11 and the solid electrolyte 3 beyond the lower end of the solid electrolyte 3 into the supply container 9. The mat 13 extends in the embodiment examples shown here to the lower end of the metallic housing 2. Ceramic fibers are preferably used for fabricating the mat 13. A support element 14 is provided to enable the mat 13 to retain its cylindrical form within the supply container 9. The latter is made of a metallic screen, preferably a molybdenum screen. The support element 14 is bent in cylindrical shape, and its dimensions are chosen so that the mat 13 rests within the supply container 9 against its outside surfaces. Due to the arrangement of the supply container 9 for the sodium polysulfide, the cathode space 4 can be filled completely with sulfur in the normal embodiment of the storage cell. An empty space for the reaction substances being formed is not necessary since the sodium polysulfide formed during the discharge of the storage cell is transported immediately into the supply container via the mat 13. When the storage cell is being charged, this reaction substance is brought back into the cathode space by the same path.

We claim:

1. Electrochemical storage cell based on sodium and sulfur comprising at least one anode space for the sodium anolyte and a cathode space for the sulfur catholyte with the anode and the cathode spaces separated from each other by a sodium ion-conducting solid electrolyte which permit sodium ions during the charge of the cell to migrate from the anode space to the cathode space and chemically react to form sodium polysulfide and the reverse reaction during the charge of the cell, said cathode space filled with sulfur catholyte to an extent that the addition of sodium ions during the discharge of the cell causes a rising pressure in the cathode space and the loss of sodium ions during the charge of the cell causes a decreasing pressure in the cathode space, at least one of said spaces bounded at least in some areas by a metallic housing, at least one supply container for the sodium polysulfide formed in the chemical reaction in which the only communication with the cathode space is at least one porous mat of ceramic showing wick action for transfer of said sodium polysulfide into the supply container by rising pressure caused by the sodium ions coming in the cathode space during discharge of the cell and for transfer of the sodium polysulfide back into the cathode space by decreasing pressure during the charge of the cell.

2. Electrochemical storage cell according to claim 1, wherein the mat completely covers the boundary surface of the solid electrolyte facing the cathode space and is firmly pressed against said boundary.

3. Electrochemical storage cell according to claim 1, wherein the mat covers the inner boundary surface of the supply container almost completely and is firmly pressed against the same.

4. Electrochemical storage cell according to claim 2, wherein the mat covers the inner boundary surface of the supply container almost completely and is firmly pressed against the same.

5. Electrochemical storage cell according to claim 1, wherein the mat is pressed against inner boundary surface of the solid electrolyte and the inner boundary surface of the supply container by a support element.

6. Electrochemical storage cell according to claim 5, wherein the support element is a metal screen made of molybdenum.

7. Electrochemical storage cell according to claim 1, wherein the cathode space is separated from the supply container by a cover plate.

8. Electrochemical storage cell according to claim 1, wherein the cathode space is separated from the supply container by a cover plate, and wherein the mat and the support element are brought through an empty annular space between the outer rim of the cover plate and the solid electrolyte in the supply container.

* * * * *